United States Patent

[11] 3,543,816

[72] Inventor James Arthur Thomas
 Antonito, Colorado 81120
[21] Appl. No. 780,547
[22] Filed Dec. 2, 1968
[45] Patented Dec. 1, 1970

[54] PORTABLE POWER SAW GUIDE FOR MITRE CUTS AND THE LIKE
 7 Claims, 5 Drawing Figs.
[52] U.S. Cl. .................................................. 143/6,
 143/89
[51] Int. Cl. .................................................. B27b 27/06
[50] Field of Search ........................................ 143/6—43,
 6—47, 47-6, 6, 89; 83/(Inquired)

[56] References Cited
UNITED STATES PATENTS
| | | | |
|---|---|---|---|
| 1,911,045 | 5/1933 | Tinnen | 143/6 |
| 2,396,961 | 3/1946 | Meredith | 143/6 |
| 2,823,709 | 2/1958 | Konieczka | 143/6 |

Primary Examiner—Donald R. Schran
Attorney—Edwin M. Thomas

ABSTRACT: A guide or adapter for portable power saws is designed to rest on and lock to the timber to be cut in order to facilitate cutting structural elements that are used in quantity in construction, such as rafters, for example. It comprises a saw base adapter and an adjustable protractor and guide arm or track for the saw with quick-release adjustable clamping means for engaging the timber to be cut. The clamping means is designed to hold firmly to timbers of moderate dimensions or tolerances without readjustment and the saw can slide freely on and off the guide track.

Patented Dec. 1, 1970
3,543,816
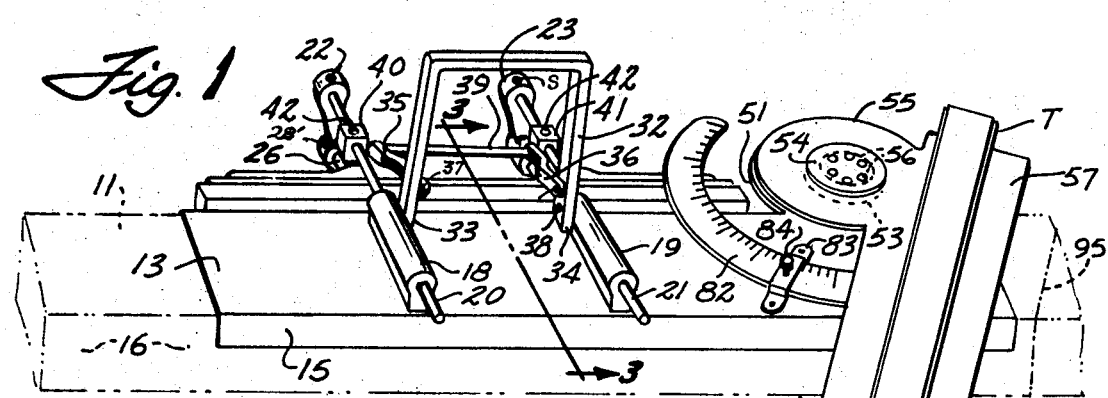
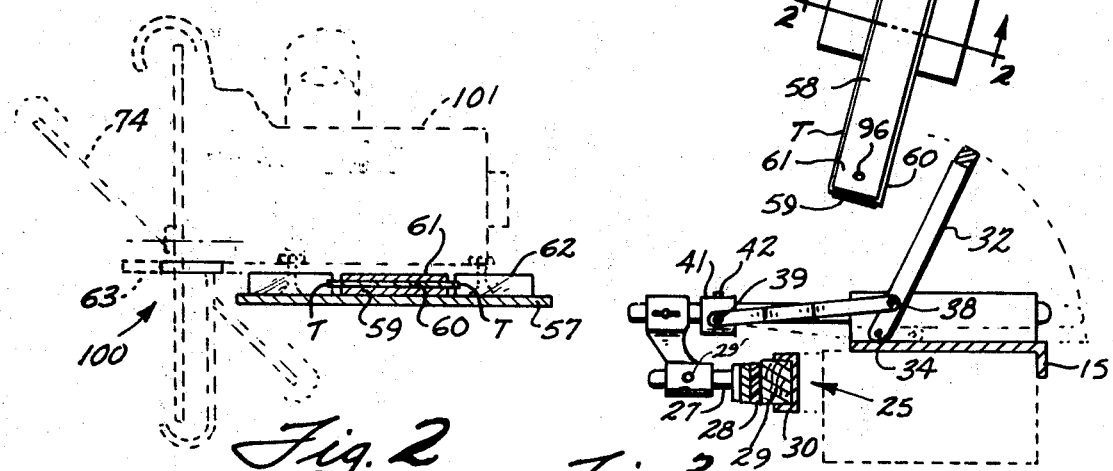
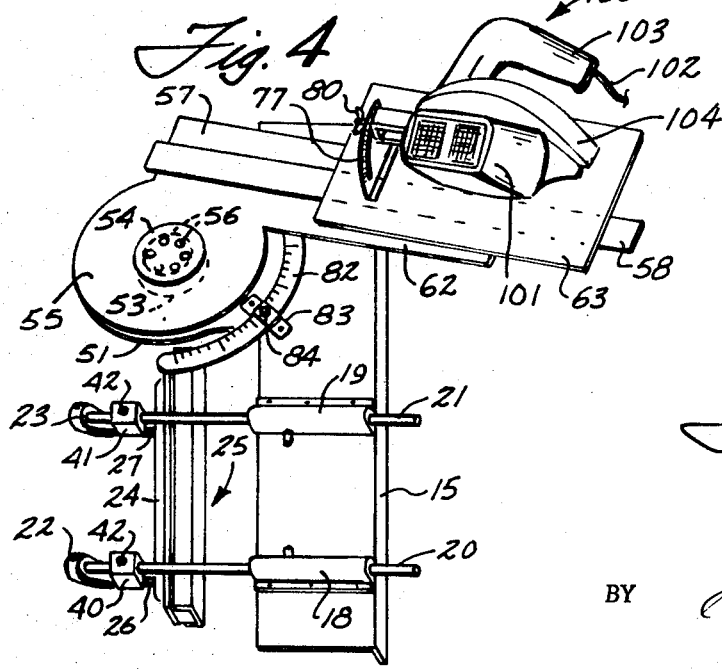
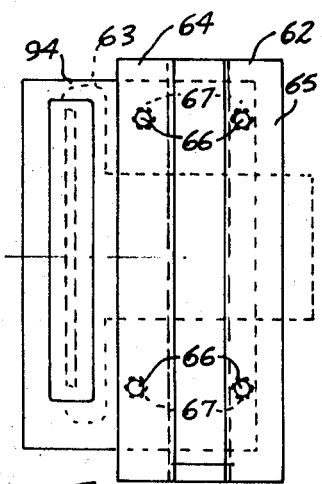
INVENTOR
JAMES A. THOMAS
BY
ATTORNEY

PORTABLE POWER SAW GUIDE FOR MITRE CUTS AND THE LIKE

BACKGROUND AND PRIOR ART

A need has long been recognized for a simple and instantly detachable device for mechanically guiding a manually operated power saw so that a relatively unskilled carpenter can perform work of good quality. An early example is shown in U.S. Pat. No. 1,540,388. In such operations as cutting rafters, manual or portable power saws either have hat been used very successfully by most operators or the work quality has been poor. A number of devices have been proposed to convert portable power saws to bench or table saws, in order to cut timbers along desired lines. In general these have not been as successful as might be desired, and they are mechanically complex, and not versatile. In U.S. Pat. No. 2,620,835, for example, a saw guide is attached to a table or platform and can be adjusted angularly. See also U.S. Pat. Nos. 2,630,146, 2,718,907, and 2,903,026. Such devices can be used to make transverse cuts at a desired angle in a main plane of the timber. Devices of this type, however, usually require that the timber to be cut be held manually against a guide or stop element, which is often difficult. If the timber is not accurately and firmly held, the angle of cut, of course, will not be true. Furthermore, in most of these devices there is no provision for cutting in a plane other than perpendicular to a main face of the timber. Inaccurate angles, especially at the apex and hip joints or rafters, greatly reduce structural strength.

Various types of jigs have been proposed, as in U.S. Pat. No. 2,876,808, for holding timbers or guiding saws while various types of cuts are made. In some cases elaborate apparatus is suggested for resting on a support such as a pair of saw horses. For example, an apparatus as in U.S. Pat. No. 2,994,351, is secured to a heavy timber. It has means for positioning saws or marking cuts at various points, e.g. to cut the ridge end of a rafter, cut a notch as the wall plate end, etc. It is highly desirable, for applicant's purpose, to keep the saw guide simple, light in weight, and directly attachable to the rafter which is to be cut to avoid use of tables and other special supports. This is not possible with most of the devices described above. So-called radial arm saws are heavy, and, as a rule, the work must be brought to them.

Various devices have been proposed for, in effect, converting portable power saws to radial arm types (nonportable). These have various advantages for many purposes but they still require that the work be brought to the saw; hence, they are not entirely suitable for the purposes of the present invention.

Particular objects of the present invention are to make it possible to convenient to:
 a. use the timber itself as the basic support for the saw and the guide that is designed to control the saw;
 b. attach the saw to a simple slidable base which is easily removable and slidable and guidable on a simple, accurate, and lightweight straight track element attachable by quick release means to the timber to be cut;
 c. adjust the guide to any desired cutting angle in the plane of a main face of the timber;
 d. independently adjust the saw on its own base to cut any desired angle with respect to said plane of a main face while remaining under control of the guide;
 e. positively and quickly secure the guide successively to the timbers to be cut, even though these timbers may vary somewhat in dimensions;
 f. produce a series of structural elements, with identical cuts in rapid succession with very simple equipment.

There are important advantages in using the timber itself as a basic guide and support for the saw. No workbench or other base is needed. The timber to be cut can be laid across a pair of sawhorses, or one end may rest on the floor or ground and the other on a horse or other support. Most commercial saws need no modification other than (possibly) drilling a plurality of holes in the normal base plates, and attaching a guide plate. This guide plate can be left on the saw, for most normal uses of the saw, without interference, but it can be quickly removed, if desired. The guide plate or auxiliary adapter base is designed to slide along a simple but highly accurate guide track which is formed as to retain the saw against any displacement or misalinement during the cut.

Most, if not all, commercial hand-controlled power saws are adjustable with respect to their own bases which support the saw proper. Hence, the plane of the saw blade can be readily changed, e.g. to a 45° angle, as distinguished from the normal vertical, to cut, for example, jack rafters, hip rafters, and other special cuts involving nonperpendicular angles in two planes.

The device is designed to be readily clamped to and unclamped from the timbers to be cut so that there will be no or minimal misalinement due to carelessness, and no bad angle cuts because of failure to hold the timber firmly against a guide or to hold a guide and the attached saw firmly against the timber. When the cut is finished, the guide, which is light in weight, and the saw are released and lifted off as a unit for placement on and clamping to the next timber. The clamping device is readily adjustable to fit 2×4, 2×6, 2×8 and other timbers of standard or conventional sizes and can be fitted to irregular timbers if necessary, without substantial modification. The saw, of course, should have adequate cutting depth to cut all the way through the timber at the desired angle.

While particular reference has been made above to cutting rafters, which commonly involve quite a lot of skilled labor, the invention is equally useful for making square end, mitre, or other angular cuts on large moldings, trim boards, as well as joists, studding, and other structural members used in quantity in the building trades. Obviously, it can be used also for cutting of flooring, frames, and other elements. The normal guide is made long enough for cutting timbers of the most common widths; however, by using a guide of suitable length, this invention can be used for cutting wider doors, trimming window sash, etc. Other uses and advantages will appear or will be obvious to those skilled in the art from the detailed description given below.

BRIEF DESCRIPTION OF DRAWINGS

FIG. 1 shows a perspective view of a preferred embodiment with the saw omitted.

FIG. 2 shows a sectional view of the saw guide track, taken substantially along line 2–2 of FIG. 1.

FIG. 3 shows a sectional view at a different angle, of the work gripping or clamping mechanism, taken substantially along line 3–3 of FIG. 1.

FIG. 4 shows a view, illustrating how a conventional portable power saw is set on the guide track where it can be moved along the track, which can be adjusted to various angles with respect to the work timber and the clamping mechanism.

FIG. 5 is a bottom view showing the adapter or auxiliary base secured to the conventional bottom plate or base of a conventional saw.

DESCRIPTION OF PREFERRED EMBODIMENT

The device will now be described as attached to a timber or plank 11, shown in dotted lines in FIGS. 1 and 3. It will be understood that timber 11 is to be cut to form a rafter or other structural piece. A main support member 13 for the mechanism of the present invention is a flat rigid plate having a timber-engaging side flange 15 and is made of aluminum or other metal of adequate strength, preferably light in weight. The plate 13 is adapted to lie on the top face of timber 11 and to be secured thereto to hold the whole apparatus in a true plane parallel with the top surface of the timber. The width of plate element 13 should be not greater than the narrowest board or timber that is to be cut, e.g. 3½ inches or so for most work on nominal 2-inch structural timbers, although it may be wider or narrower, if desired. Depending flange 15 is adapted to fit and aline the device and serve also as a timber-clamping element along the front edge 16 of the plank or timber 11 which is to be cut.

Mounted on member 13, by rivets or by welding, or equivalent, are a pair of transversely extending parallel tubular guide brackets 18 and 19. These are adapted to receive in smooth sliding fit and for parallel movement a pair of rods 20, 21, respectively attached firmly to ears 22, 23 of a rectilinearly movable clamp supporting bar 24. A smooth clamping plate 25 is attached to clamp bar 24 through rods 26, 27, which are fixed to the ears 22 and 23, respectively, e.g. by set screws S. Through a resilient strip 28 of rubber or equivalent elastic material, a clamp bar 29 of wood, preferably faced with metal 30, is adapted to be forced into clamping engagement with the rear side of the timber 11. The timber thus is gripped snugly and firmly between flange 15 and bar 29, 30. Resilient strip 28 permits the clamp to grip timbers of slightly varying widths without special or individual adjustment, to accommodate the usual tolerances in saw mills and planers, and/or to accommodate timbers which vary moderately in transverse dimensions due, for example, to variations in moisture content. The metal element 30 is not essential in all cases but the clamp bar 29 should have its timber engaging face true and solid so as to grip the piece 11 firmly but without objectionable marring. The face of member 29 (or 30) and/or the inside surface of flange 15 may be lightly grooved or knurled to improve the grip, if desired. Normally, this is not necessary.

A bifurcate lever 32, FIG. 1, is pivoted at its ends 33, 34 to the two brackets 18 and 19. At a short distance from these end pivots, a pair of links 35, 36 are pivotally attached at 37, 38, one of each arm of the bifurcate lever. The opposite ends of these links are pivotally attached to a transverse bar or shaft 39. Bar or shaft 39 is mounted at its ends in a pair of blocks 40, 41 adjustable secured to guide rods 20 and 21, respectively. Set screws 42 can be loosened and reset to adjust the clamp for timbers of different widths. Separate pins can replace bar 39 if desired.

These adjustment means are arranged so that the clamp elements 15 and 30 will grip any reasonably standard two-by-four, two-by-six or other timber without regard to minor variations in timber width. The resilient strip 28 permits this. There is also, of course, some slight resilience in the clamping mechanism, aside from strip 28, which allows some small tolerance. In this way it is a simple matter to change the width of the clamp system for substantially different timber widths, while it is unnecessary to adjust from timber to timber to accommodate minor variations.

The ears 22, 23 also may be secured adjustably to rods 20, 21 by means of set screws 28', 29', if desired. In this case, the links 35 and 36 can be permanently attached to the guide rods 20 and 21. The arrangement shown is presently preferred, however. When the bifurcate lever 32, FIG. 1, is pulled forward to or slightly past dead center for pivot points 34, 35 with respect to pivots 30, it acts as a powerful toggle to move the guide rods and the clamp member 25 per se to clamping position and thus the device is firmly clamped to the timber.

The main support member 13 is secured to or, if preferred, may be made integral with an ear-shaped extension or bearing base 51. The latter, as best seen in FIG. 4, supports on a large diameter bronze bearing 53 a rotatably mounted protractor plate or disc element 55. The arrangement is such that the bronze bearing is of the same thickness as the element 55 so that the parts fit snugly, avoiding any measurable play. The disc 55 is fastened to a stiff straight guide bar or track base plate element 57. The disc part 55 and plate 57 may be formed in a unit piece or may be made up in separate pieces and fastened together by rivets or by welding, etc. Plate 57 has mounted on its upper face a guide bar or track 58 having protruding tongue elements on each lateral edge. Track 58 may be machined from a simple piece of stock, or alternatively, it may be made up of laminations 59, 60, 61 of which the upper and lower elements 59 and 61 are slightly narrower that the one 60 between them. See FIG. 2 for a cross section of these parts. Cooperating parts 62, 63 are shown in dotted lines. The bar 58, unitary of composite, serves as a guide track for a simple base plate adapter 62. Adapter 62, of which a bottom view is shown in FIG. 5, attaches to a conventional saw base plate 63. It has a pair of spaced parallel grooved guide bars 64, 65, FIG. 5, which engage the tongue elements T mentioned above. These tongue and groove elements T, etc., act as slideways to keep the base plate adapter 62 running true and in a straight line. The saw 100 is secured to its own base plate 63 and, of course, is constrained to travel in a straight line when adapter base 62 is placed on the guide track. The saw can be slid freely off the end of the track whenever the operator wants to use it for some other purpose but it cannot be raised off the track while cutting. The attached adapter 62 is light in weight and only a small fraction of an inch in thickness. It does not interfere with normal use of the saw. It is attached by countersunk screws 66 and nuts 67, which can be readily removed if desired.

The saw 100, which may be of any conventional type e.g. circular saw, sabre saw, etc., preferably circular, is normally secured, for pivotal adjustment, to its conventional base plate 63. A graduated sector or protractor member 77 is conventionally secured to base plate 63 and arranged to position the plane of the saw blade B in any desired adjusted angle. A set screw 80 or equivalent normally is adapted to be tightened against the sector 77 to hold the parts in the desired position of adjustment. With this arrangement, the saw 100 may be adjusted in angular position with respect to a plane normal to the top face of the timber. For simple rafters, cutting off the ends of joists, studding, etc., the saw is essentially perpendicular to surface plane of the work, as will most commonly be required; however, for cutting the upper ends of jack rafters, or of hip rafters, etc., this angle can be changed and the saw set to an appropriate angle, such as 45°, as shown in dotted lines 74, FIG. 2. The protractor angle, as determined by arcuate arm 82, fixed to base plate 57 and concentric with protractor disc 55, is set appropriately by the parts next to be described.

The saw 100, FIG. 4, which, of course, is no part of the present invention, is driven by conventional motor means 101 (and may include gear reduction means). Electric current is supplied through a cord 102 and the operating handle 103 is of conventional type. The saw generally has a conventional safety guard 104, the lower part of which may be retracted while the machine is operated, as is common practice.

The arcuate arm of protractor index 82 on the saw guide itself is concentric with the bronze bearing 53 and disc 55 and indicates the angle to be cut with respect to an edge of the timber. A clamp screw 84 is set in a slotted or undercut guide plate 83. When tightened against arm 82, this screw holds the parts at the desired angle. Once the device has been set, as many rafters or other parts may be cut as desired by simply clamping the unit to each timber in turn, turning on the saw motor, and pushing the saw along guide track 58, with the tonque elements T engaged by base adapter 62 as described above. Cap 54 is secured by nuts on adjustable screws 56 tapped in bearing 53 with their heads smoothly countersunk into base 51 and holds these parts in snug frictional fitting relationship.

In using the apparatus of this invention, the carpenter first adjusts the clamp to fit the timber by loosening set screws 42 (or 28', 29', if preferred), sliding the clamp bar 29, 30, to appropriate position and retightening. The clamp should fit tightly but not so tight as to mar or deform the timber. The resilient rubber strip 28 should be partly, but not completely, compressed. Then he sets the protractor arm 82 to the desired angle, by loosening and resetting the screw 84. The base adapter 62 is attached to the saw base 63 by screws 66, if not already secured to it, and the appropriate angle for the saw cut is set on the saw protractor 77.

The saw adapter base is then slid onto the outer end 96 of the track member 58. The saw motor is turned on and the saw slid along the track, which it must follow until the cut is complete, unless the saw is withdrawn in the reverse direction. As a rule the saw will be withdrawn from track 58 before the guide device is unclamped from the timber by raising bifurcate lever 32 and shifted to another piece to be cut.

It will be understood that various modifications and variations may be made in the apparatus of this invention. It is desirable to have parallel movement of the clamping bar for smooth operation; hence, guides such as rods 20, 21, and their receivers 18 and 19 are preferred, but other obvious arrangements can be used. If desired, compression springs may be mounted in the guides 18 and 19 and arranged to draw the clamp bar 24 snugly against the timber, in which case the lever 27, preferably bifurcate but which may be single in some cases, is operated only to release the clamp from the timber, i.e. to open it for application to a new timber. The guide member which attaches to the saw is complementary to the guide rail 58, which may have other sectional shapes or configurations then those shown, e.g. it may be provided with a T-slot etc., with appropriate followers or tracking elements being provided on the saw base or adapter 63. The whole guiding apparatus is relatively very light in weight. It is sturdy and reliable and gives perfect guidance to the saw. Besides insuring accurate cutting it also reduces greatly any danger of injury to an inexperienced saw operator.

Various parts of the apparatus may be changed or modified, as will be evident to those skilled in the art, without departing from the spirit, purpose or principles of the invention.

It is intended by the claims which follow to cover the foregoing, and other obvious variations, modifications and combinations, as broadly as the prior art properly permits.

I claim:

1. A control device and guide for portable power saws, adapted to be secured to and supported by a timber to be cut, comprising, in combination, a rigid base member having a plane surface adapted to engage and lie flat on a timber surface, said base member having also a rigid side flange disposed at a right angle to said plane surface and adapted to serve as one element of a clamp for said timber, spaced parallel guide means secured to said base, and extending transversely thereon with respect to said flange, parallel clamp-supporting elements adapted to move under guidance of said guide means to clamping and nonclamping positions, respectively, a second clamp element carried by and adjustable with respect to said parallel supporting elements and adapted on movement of said elements to engage a surface of said timber opposite the flange for clamping in firmly, clamp-operating means pivoted to said base and connected to said elements, an elongated saw guide, bearing means securing said saw guide pivotally to said base, indicator means for showing angular relationship between said guide and said base, means for holding the saw guide in a selected angular relationship with respect to the base, means on the saw guide for holding a portable saw in a constrained path of travel for cutting in a plane transverse to said timber, and an adapter attachable to said saw and fitted to the saw guide for keeping the saw on said guide during a cutting operation.

2. Combination according to claim 1 wherein the saw guide comprises a track element having a protruding tongue element on each side thereof, and the adapter is formed with grooves to receive said tongue elements in sliding relationship.

3. Construction according to claim 1 wherein the adapter comprises a track element which is open ended and on which the adapter is slidable and fully withdrawable from said track element.

4. Combination according to claim 1 in which the saw guide has a pair of undercut surfaces and the adapter has complementary elements for preventing removal of the saw by lifting from the guide during a cutting operation.

5. Combination according to claim 1 in which the second clamp element includes a rigid backing bar, a timber-engaging bar and a resilient layer of material between said bars.

6. Combination according to claim 1 in which the clamp-operating means comprises an overcenter toggle lever.

7. Combination according to claim 1 in which the guide is mounted to the base member without play through a snugly fitting friction bearing.